(No Model.) 2 Sheets—Sheet 2.
W. H. PARRY.
SAW FILING AND SETTING MACHINE.
No. 427,898. Patented May 13, 1890.
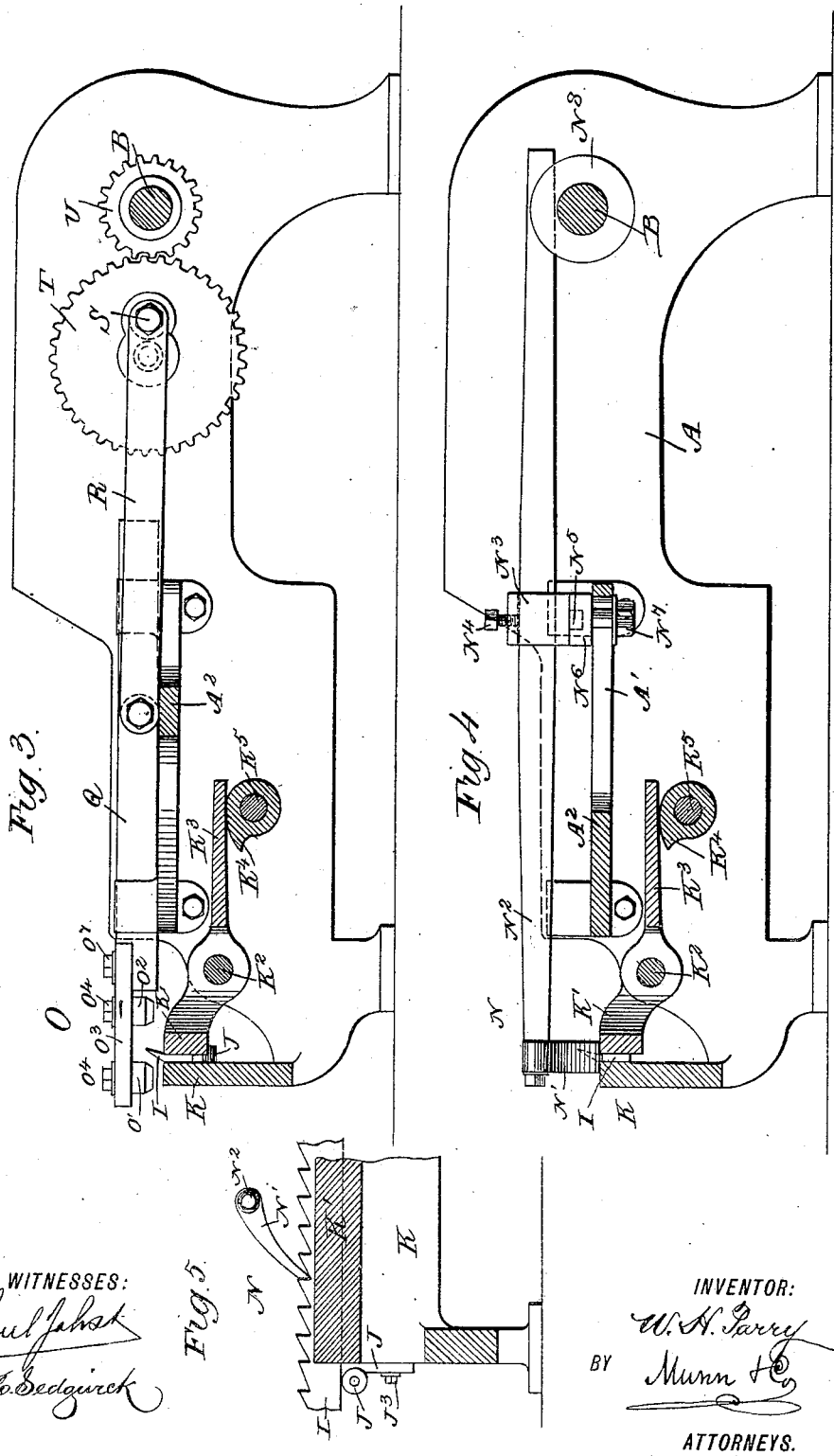
WITNESSES:
Paul Jahnst
C. Sedgwick
INVENTOR:
W. H. Parry
BY Munn & Co.
ATTORNEYS.

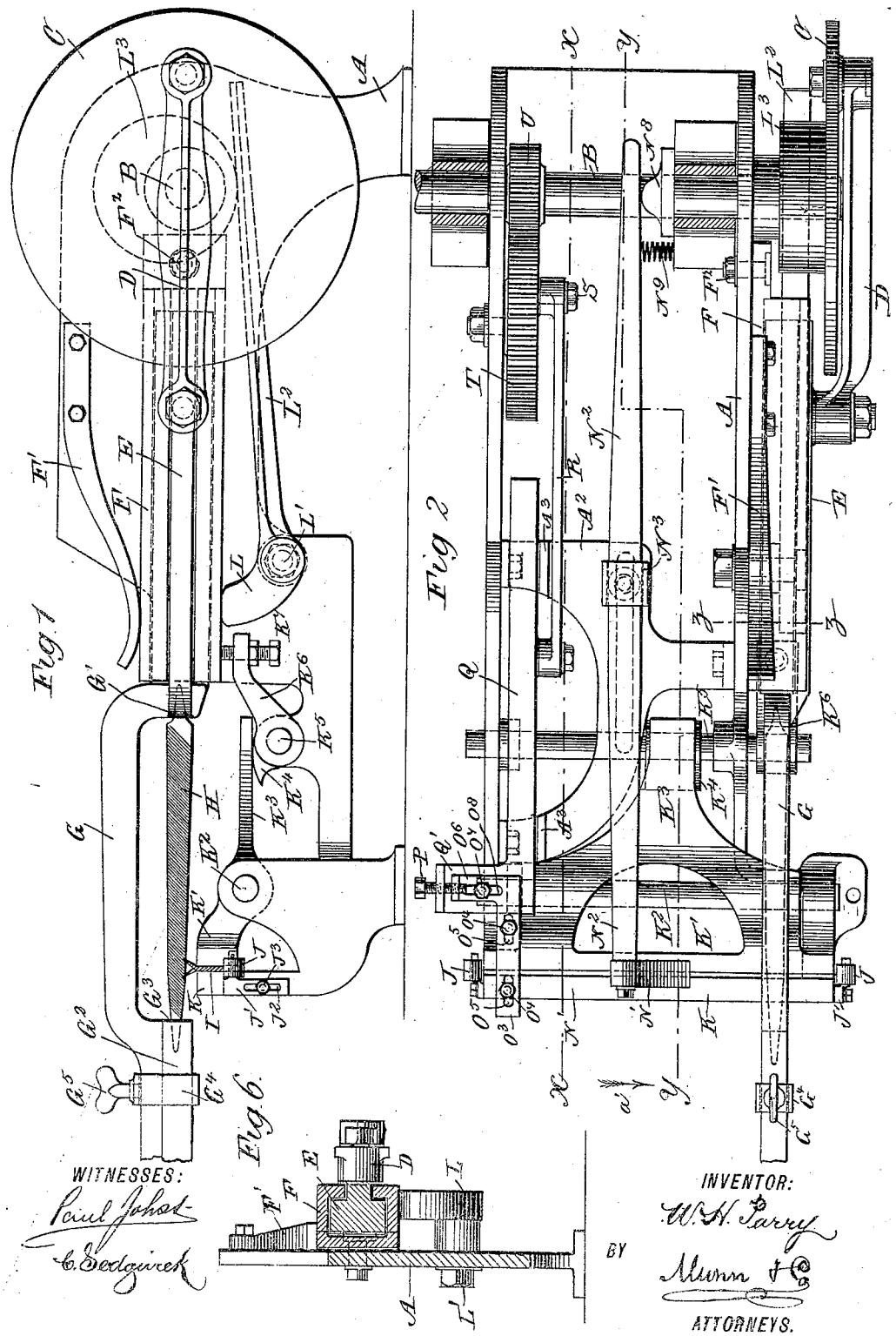

UNITED STATES PATENT OFFICE.

WILLIAM H. PARRY, OF NEW YORK, N. Y., ASSIGNOR TO JAMES H. HAVENS, OF SAME PLACE.

SAW FILING AND SETTING MACHINE.

SPECIFICATION forming part of Letters Patent No. 427,898, dated May 13, 1890.

Application filed September 6, 1889. Serial No. 323,123. (No model.)

*To all whom it may concern:*

Be it known that I, WILLIAM H. PARRY, of New York city, (Fordham Heights,) in the county and State of New York, have invented a new and Improved Saw Filing and Setting Machine, of which the following is a full, clear, and exact description.

My invention is an improvement in that class of machines which have a saw that is alternately clamped and released and moved the distance of one tooth during the reciprocating movement of a file-holder that slides in a guideway adapted to vibrate in a vertical plane.

The features constituting the improvement are as hereinafter described and claimed.

Reference is to be had to the accompanying drawings, forming a part of this specification, in which similar letters of reference indicate corresponding parts in all the figures.

Figure 1 is a side elevation of the improvement. Fig. 2 is a plan view of the same with parts in section. Fig. 3 is a sectional side elevation of the improvement on the line $x\ x$ of Fig. 2. Fig. 4 is a similar view of the same on the line $y\ y$ of Fig. 2. Fig. 5 is an end elevation of the saw-feed, and Fig. 6 is a transverse section of part of the improvement on the line $z\ z$ of Fig. 2.

The improved saw filing and setting machine is mounted on a suitably-constructed frame A, in one end of which is held the main driving-shaft B, connected by suitable means with the machinery for imparting a rotary motion to the said shaft. On the shaft B is secured a crank-disk C, pivotally connected with a pitman D, connected with a slide E, mounted to slide in a guideway F, pivoted at one end at $F^2$ to the main frame A. On the other end of the slide E is formed a file-holder G, supporting the file H, preferably of three-cornered shape, as shown in the drawings. The file H fits with its pointed base end in an aperture $G'$ in the holder G, and its outer end fits in an aperture $G^3$, formed in a block $G^2$, secured by a clamp $G^4$ on the outer end of the file-holder G by means of a set-screw $G^5$. By loosening the set-screw $G^5$ the clamp $G^4$ permits of moving the block $G^2$, so as to remove a worn-out file and insert a new one when desired. The file H swings forward and backward on the teeth of the saw I to be filed.

The saw I is supported on rollers J, mounted to turn on brackets $J'$, secured by bolts $J^3$ to the sides of the main frame A at the front end. The brackets $J'$ are vertically adjustable by the said bolts $J^3$ passing through slots $J^2$ in the said brackets. By this means the rollers J can be raised or lowered, so as to accommodate saws of different widths.

The saw-blade is held in a clamping device comprising a fixed jaw K, held on the front end of the frame A, and a movable jaw $K'$, adapted to press the saw-blade against the fixed jaw K. The movable jaw $K'$ is formed on a shaft $K^2$, extending transversely and mounted to turn in suitable bearings in the frame A. From the shaft $K^2$ projects rearward an arm $K^3$, resting on top of a cam $K^4$, mounted on a shaft $K^5$, extending transversely and mounted to turn in suitable bearings in the main frame A. On the front end of the shaft K is formed an arm $K^6$, connected by a screw $K^7$ or other means with the under side of the guideway F at its free front end. The under side of the free end of the said guideway F rests on one end of a lever L, fulcrumed at $L'$ on the main frame A and having its other end $L^2$ resting against the periphery of the cam $L^3$, secured on the main driving-shaft B. Thus when the latter is rotated a forward and backward sliding motion is imparted to the slide E and its file-holder G, and at the same time the said slide will move up and down with its guideway F, raised and lowered by the lever L, operated from the cam $L^3$.

In order to hold the guideway F in contact with the lever L, a spring $F'$, secured to the main frame A, presses on top of the guideway F. When said guideway swings upward, the cam $K^4$ swings downward, so that the movable jaw $K'$ is disengaged from the saw-blade I. When, however, the guideway F swings downward onto the screw $K^7$, the arm $K^6$ moves the shaft $K^5$ so as to raise the cam $K^4$, whereby an upward pressure is exerted against the arm $K^3$, fastened on the shaft $K^2$, so that the latter turns and presses the movable jaw K' against the saw-blade I, so as to clamp the latter in place.

During the time that the movable jaw K' is released the file H is disconnected from the teeth of the saw-blade I, and now the feeding mechanism N operates on the saw-blade so as to move the saw-blade forward the distance of one tooth. The feeding mechanism N is provided with a pawl N', adapted to engage the teeth of the saw-blade I, and is pivoted on one end of a lever N², having a movable fulcrum formed by a sleeve N³, held adjustably on the lever N² by a set-screw N⁴. (See Fig. 4.) On the under side of the sleeve N³ is formed a pin N⁵, mounted to turn in a nut N⁶, held adjustably on a transverse plate A² of the main frame A. The nut N⁶ is fastened in place by a bolt N⁷, passing through a longitudinally-extending slot A⁷, formed in the said transverse plate A². By adjusting the sleeve N³ forward or backward on the lever N² the throw of the latter may be increased or diminished. The inner end of the lever N² is operated on by a cam N⁸, secured on the main shaft B, so that when the latter is rotated a sidewise swinging motion is imparted to the lever N², which, by its pawl N', moves the saw-blade I forward at the time that the file H is disengaged from the teeth of the saw-blade and the movable jaw K' is out of contact with the blade. The spring N⁹ serves to hold the inner end of the lever N² against the cam N⁸.

The saw-setting mechanism O is actuated from the main driving-shaft B, and is provided with two blocks or dies O' and O², placed in line with each other at the sides of the saw-blade I. The blocks O' and O² are secured on a plate O³ by means of bolts O⁴ passing through slots O⁵ in the said plate O³. By adjusting the bolts O⁴ said blocks O' and O² may be moved nearer to each other or farther from each other, according to the size of the teeth to be set. The plate O³ is provided with a rearwardly-extending arm O⁶, provided with a slot O⁸, through which passes a bolt O⁷, securing the arm O⁶ to a rearward extension Q' on a slide Q, held to slide longitudinally in suitable guideways A³ formed on the main frame A. The plate O³ is adapted to be adjusted transversely by a bolt P, screwing in the extension Q' and engaging the arm O⁶, so that when the bolt O⁷ is loosened and the screw P is turned the arm O⁶ moves transversely so as to bring the blocks O' and O² in proper position for the teeth to be operated upon.

The slide Q is pivotally connected by a pitman R with a crank-pin S, secured in the face of a gear-wheel T, mounted to turn on a stud secured on the main frame A. The gear-wheel T meshes in a pinion U, secured on the main driving-shaft B, so that when the latter is rotated the gear-wheels U and T rotate, and the gear-wheel T, by its crank-arm S, imparts a forward and backward sliding motion to the slide Q, whereby the blocks O' and O² press alternately against succeeding teeth on the saw-blade I in opposite directions, so as to set the teeth.

The operation is as follows: When the several parts are in place, as shown in the drawings, and motion is imparted to the main driving-shaft B, then the file H swings forward and backward and at the same time moves up and down by the action of the cam L³, as previously described. When the file moves forward, it files one of the teeth of the saw I in the usual manner, and at its return-stroke is sufficiently raised above the saw to disengage the same entirely. On the return-stroke of the file H the cam K⁴ is in its lowermost position, so that the movable jaw K' is disengaged from the saw I, and the latter is moved forward the distance of one tooth by the pawl N' of the feeding mechanism N, moving the saw in the direction of the arrow a' the distance of one tooth. As soon as the guideway F swings downward to its lowermost position the movable jaw K' again clamps the saw onto the fixed jaw K, and then the block O' or O² is moved longitudinally, so as to engage one of the teeth of the saw and press the same outward. The slide Q operates in conjunction with the slide E and the lever N² on every full stroke of the file N. The slide Q moves only forward and backward, whereby one tooth is pressed in one direction by one of the blocks O' or O², and at the next movement of the slide Q the following tooth is pressed in the opposite direction by the respective block O² or O'. It is to be understood that the latter are shaped according to the form of tooth used. The under sides of the blocks are beveled, so as to press the tooth into an inclined position, as indicated in Fig. 1.

Having thus fully described my invention, I claim as new and desire to secure by Letters Patent—

1. In a saw filing and setting machine, the combination, with the vertical support A and the driving-shaft, of a reciprocating file-holder and a guideway for the latter, which is pivoted contiguous to said shaft and arranged radially therewith, a pivoted cam-lever L, arranged beneath said guideway, a cam on the driving-shaft for operating the cam-lever, a pitman connecting the file-holder and a disk on the shaft, and a clamp for holding the saw-blade, as shown and described.

2. In a saw filing and setting machine, the combination, with the vertical support A and the driving-shaft, of a reciprocating file-holder and a guideway for the latter, which is pivoted contiguous to said shaft and arranged radially therewith, a pivoted cam-lever L, arranged beneath said guideway, a cam on the driving-shaft for operating the cam-lever, a pitman connecting the file-holder and a disk on the shaft, a saw-blade clamp whose movable jaw is a pivoted lever K', the pivoted cam-lever K$^4$ K$^6$, for operating said jaw, the free end of said guideway resting on the cam-lever, and means for connecting the sliding file-holder and a disk on the shaft, all operating conjointly, as shown and described.

3. In a saw filing and setting machine, the combination, with a driving-shaft and a saw-blade clamp, of the sliding plate operated from said shaft and having the blocks O' and O$^2$ adjustably attached to and arranged in line with the said plate and on opposite sides of the saw-blade.

4. In a saw filing and setting machine, the combination, with the vertical support A, the rotary shaft and the saw-blade clamp, of the sliding plate O$^3$, having slots O$^5$ and the rearwardly-extending slotted arm O$^6$, the blocks O' and O$^2$, bolts O$^4$, passing through the slots of said plate, the bolt P, for adjusting the plate O$^3$ transversely, and a slide Q, having extension Q', all as shown and described.

5. In a saw filing and setting machine, the combination of the saw-feeding lever N$^2$, its fulcrum N$^3$, which is adjustable, as specified; the pawl N', and the spring N$^9$, with the vertical support A, the driving-shaft having the cam N$^8$, the saw clamping and releasing mechanism consisting of the fixed jaw K, pivoted jaw K' K$^3$, and the cam-lever K$^4$ K$^6$, acting on the latter, the pivoted guideway F and file-holder E sliding therein.

WILLIAM H. PARRY.

Witnesses:
 THEO. G. HOSTER,
 EDGAR TATE.